(12) United States Patent
Summersgill et al.

(10) Patent No.: US 7,605,002 B2
(45) Date of Patent: Oct. 20, 2009

(54) MODULAR MICROFLUIDIC SYSTEM

(75) Inventors: Philip Summersgill, Redcar (GB);
Timothy George Ryan, Middlesbrough (GB); Thomas Grierson Harvey, Stokesley (GB)

(73) Assignee: Epigem Limited, Redcar (GB)

( * ) Notice: Subject to any disclaimer, the term of this patent is extended or adjusted under 35 U.S.C. 154(b) by 651 days.

(21) Appl. No.: 10/526,981

(22) PCT Filed: Sep. 5, 2003

(86) PCT No.: PCT/GB03/03853

§ 371 (c)(1),
(2), (4) Date: Jun. 7, 2005

(87) PCT Pub. No.: WO2004/022233

PCT Pub. Date: Mar. 18, 2004

(65) Prior Publication Data

US 2005/0255003 A1  Nov. 17, 2005

(30) Foreign Application Priority Data

Sep. 6, 2002 (GB) ................................. 0220746.2
Jun. 13, 2003 (GB) ................................. 0313657.9

(51) Int. Cl.
*G01N 1/00* (2006.01)

(52) U.S. Cl. ........................ 436/174; 436/180; 422/100

(58) Field of Classification Search ................ 422/100; 436/180, 174
See application file for complete search history.

(56) References Cited

U.S. PATENT DOCUMENTS

| 6,209,928 | B1 * | 4/2001 | Benett et al. ............. 285/124.1 |
| 6,331,439 | B1 * | 12/2001 | Cherukuri et al. ............. 506/2 |
| 6,919,045 | B1 * | 7/2005 | Berndt ....................... 422/100 |
| 2001/0007641 | A1 * | 7/2001 | Jovanovich et al. ........... 422/99 |
| 2002/0176804 | A1 * | 11/2002 | Strand et al. ................ 422/100 |

FOREIGN PATENT DOCUMENTS

WO  WO 02 30560  4/2002

* cited by examiner

*Primary Examiner*—Lyle A Alexander
(74) *Attorney, Agent, or Firm*—Jacobson Holman PLLC

(57) ABSTRACT

A modular microfluidic system is described having at least one base board with a plurality of fluidly linked fluid supply apertures, optional intermediate level boards of equivalent construction, a plurality of microfluidic modules adapted to be detachably attached to the base board/intermediate boards, each having one or more fluid inlets and/or outlets, and a plurality of fluid couplings preferably in the form of projecting ferrules to effect releasable fluid connection between a module and a base board/intermediate level board via a supply aperture on the board and an inlet/outlet on the module. A method of providing a microfluidic system as a modular assembly is also described.

12 Claims, 12 Drawing Sheets

MODULAR MICROFLUIDIC SYSTEM

This is a nationalization of PCT/GB03/003853 filed Sep. 5, 2003 and published in English.

The invention relates to a microfluidic system having a modular construction for rapid assembly and disassembly, and a method of providing such a system.

Microfluidic devices and systems have become increasingly important in recent years for performing large numbers of different chemical and/or biological operations on a manageable scale, since they allow a large number of chemical or biochemical reactions to be carried out as part of an analytical and/or synthetic process in a relatively small liquid volume. Such miniaturised analytical or synthetic operations are generally more efficient, producing increased response times and reduce the requirement for potentially expensive reagents.

Conventional microfluidic devices and components have been constructed on a chip using technology analogous to that followed in the silicon fabrication industry in general, for example by constructing the devices in a planar fashion using photolithography and etching techniques. Conventionally, there has been a tendency, in particular by analogy with miniaturisation elsewhere in the silicon industry, to concentrate development efforts on miniaturising onto a single chip of as small a size as possible all chemical, biochemical and biological processing associated with a particular synthetic and/or analytical process.

Such constructions offer many advantages. However, the resultant chip is relatively inflexible. It is not always easy to intermix different materials and device technologies within such a single chip. Inspection, maintenance and repair can be complex.

It is an object of the invention to provide a microfluidic system which offers enhanced flexibility and which mitigates some or all of the disadvantages of single chip integral systems.

It is a particular object of the present invention to provide a modular microfluidic system in which various different microfluidic components are readily assemblable and disassemblable into a complete system to offer enhanced flexibility and utility.

Thus, according to the present invention in a first aspect there is provided a modular microfluidic system comprising at least one base board having a plurality of fluidly linked fluid supply apertures on one or both sides thereof, a plurality of microfluidic modules adapted to be detachably attached to the base board, each having one or more fluid inlets and/or outlets, and a plurality of fluid couplings to effect releasable substantially fluid-tight fluid connection between a module and a base board via a supply aperture on the base board and an inlet/outlet on the module.

Preferably further the system comprises at least one fluid source aperture fluidly linked thereto to supply source fluid to the system, and/or at least one fluid output aperture fluidly linked thereto to output fluid from the system. Source and/or outlet apertures may be provided in direct communication to the baseboard or via modules. A plurality of such fluid source apertures and/or fluid output apertures may be provided.

The fluid supply may be gaseous or liquid. More than one fluid may be supplied to any given system.

In accordance with the invention, the microfluidic circuit is built up on the base board, with the system being formed in modular fashion upon the base board chip, rather than being integrated therewith in conventional manner. Fluid is supplied to the constructed microfluidic system via the fluid source aperture in the baseboard or by direct introduction into a module. The base board chip is preferably constructed with a pattern of at least partly interconnecting microfluidic channels to provide a plurality of fluid channels and/or chambers linking in fluid communication at least some of the supply apertures to each other and/or to the source aperture. The fluid supply passages within the modules act in co-operation therewith to complete a desired microfluidic circuit when the modular structure is assembled, the circuit serving to distribute fluid to interconnection points on the board and hence to the modules. The assembled system may provide a plurality of such circuits functioning in association or independently.

The invention offers significant advantages, particularly in relation to flexibility of construction in use, when compared with prior art systems. Chip module to base board interconnections may be made conveniently compact and simple, whilst at the same time connections between the board and external equipment can utilise well established fittings for interfacing to that equipment. Intermixing of different materials and device technology is enabled (for example glass chips on a polymer board). In the same way a choice of external systems such as external pumps as well as on-board or module-surface mounted pumps and valves etc. is offered.

The system of the invention offers flexibility of design choice. For example a simple baseboard design may be provided with exchangeable complex modules, or complex systems may be included within the baseboard, with the modules attachable thereto being simple and/or disposable. Seals and connections between module and board can be selected according to module function.

The overall system provides for simple inspection and maintenance, flexibility of use, and ease of repair to systems, for example by replacing only a module which is defective rather than an entire system.

A microfluidic module in accordance with the invention comprises one or more microfluidic devices. As used herein, a microfluidic device may comprise any known element of a microfluidic system, including without limitation an active device unit, such as a reactor, heater, cooler, analyser, detector, mixer, processor, separator or the like, a fluid function unit such as a pump, valve, filter or the like or merely a fluid channel, chamber or manifold to complete a particular microfluidic circuit.

Microfluidic devices in accordance with the invention may be three dimensional or generally planar. In a preferred embodiment, the devices are generally planar. Each module has a generally planar construction to be incorporated upon a generally planar baseboard. Inlet/outlet apertures are most conveniently provided on one of the planar faces of such a module. Supply apertures are most conveniently provided on a planar face of the baseboard, and source aperture(s) may be provided at an edge or edge face or the same or opposite planar face thereof.

In particular, each module preferably has a generally planar sandwich construction, comprising at least one inner sandwich layer defining a fluid channel and/or chamber portion, and at least one cover layer covering and effecting enclosure of the same. In a preferred embodiment the module comprises at least one sandwich layer defining an enclosed fluid channel and/or chamber portion, for example consisting of paired sandwich elements into the surface of at least one of which channels are created such that the pair assembled together define such an enclosure, with cover layers at either side thereof. Further intermediate layers may be present.

Active microfluidic elements may be incorporated within the channels and/or chambers so formed in the sandwich layer or additionally or alternatively may be provided upon the module surface in fluid communication with the channel therewithin. One or more inlet and/or outlet apertures are provided to effect a fluid communication between the channel and an external surface of the module, for fluid connection to the baseboard. A baseboard may be similarly constructed.

The base board and of the modules may be fabricated conveniently in suitable plastics material. They may be constructed from monolithic blocks of material, from sandwich layers as above described, or from thin layer laminates or combinations thereof. Layers or materials which contact fluid in use are preferably fabricated when necessary from chemically resistant plastics material, such as epoxy, a photoimagable epoxy being most preferred. Suitable resistant thin film laminate materials might include epoxy glued PEN laminates. This gives good resistance with good fabricability of fluid channels and chambers. In sandwich structures, cover layers including fluid inlet/outlet ports which might also contact fluid in use are also preferably fabricated from materials exhibiting good chemical resistance, for example epoxy or other plastics such as polyetheretherketone (PEEK). Alternatively, materials may be given a suitably resistant coating in such areas.

Chemical properties of merely structural cover or intermediate layers might be less critical. Likewise material selection might be less critical for components intended for use with fluids presenting a less harsh environment. In these cases less resistant materials such as PMMA, PET, acrylic polymers and the like might be suitable.

Additionally, any materials or layers and in particular cover layers might also be modified for specific properties, for example for transparency, for electrical, magnetic or dielectric properties, to provide mountings for externally mounted microfluidic device components etc. Metallic layers may be provided or incorporated, for example to serve as a conductor, resistive heater or otherwise.

In practice, different parts of individual components might have different functional requirements, for example regarding transparency, structural strength, chemical resistance etc. Combinations of materials may be used, for example using a combination of materials and components and by using composite substrates for the baseboard and modules to achieve the best combination of properties.

For example, in the case of a microchemical reactor it is beneficial to use a substrate polymer that is optically transparent to enable easy inspection of the fluid path and/or to allow measurements and/or is thermally transparent or transparent at other wavelengths for any purpose. It will be understood however that a readily available polymer with good transparency that is also resistant to a wide range of solvents used in synthetic chemistry is not generally available. By adopting a composite approach a substrate can be readily formed comprising a composite structure having areas of a transparent material (not necessarily exhibiting high chemical resistance) where required, and areas of a chemically resistant material (not necessarily exhibiting high transparency) at least in regions where solvent contact is possible, preventing contact with the less resistant transparent substrate material. For example a basic structure comprises transparent material but in which inserts of chemically resistant material are included in the substrate in regions where solvent contact is possible. Alternatively a basic structure of chemically resistant material with "window" inserts of transparent material will serve the same purpose. Specific areas with other functionality will similarly readily suggest themselves.

As used herein, microfluidic will be understood to refer to microstructures having at least some sub-millimeter dimensions, microstructure in this case being used to refer to any of a variety of well known structures in such systems, including, but not limited to, the channels and chambers hereinabove described, that are capable of providing passage or storage for a fluid.

In accordance with the invention, a plurality of fluid couplings are provided to effect a fluid-tight connection between at least one fluid supply aperture on a base board and at least one inlet/outlet on a microfluidic device module. Fluid tight connection is preferably effected by interference fit between a coupling and a supply aperture, and couplings and apertures are sized and materials for their fabrication selected accordingly, for example being flexibly resilient at least in the region of connection.

This interference fit alone may be sufficient to maintain a fluid-tight connection, at least in use under action of supplied fluid pressure. Alternatively connecting means may be provided to hold the assembly together in use and assist in maintenance of a fluid-tight connection between modules and board by urging coupling and aperture into closer association and retaining thereat with a suitable urging force. Such connecting means may for example comprise spring clips, screws, bolts, clamps or like mechanical fixings. The connecting means connect modules and board together. There is no need for specific connecting means separately associated with each coupling/aperture connection. One or a few mechanical fasteners can be used to hold together a system making multiple fluid connections.

These connecting means will typically be releasable as it is a feature of the invention that modules are readily assembled into multiple configurations and are able to be dissasembled by a user for example for reassembly into other configurations. However it will be appreciated that in certain circumstances the user may wish to use more permanent fixings to retain coupling and aperture in fluid-tight association on a semi-permanent or permanent basis, for example by permanent mechanical fixing or gluing, and a system in accordance with the invention allows a user to choose to do this.

Conveniently, the connection comprises a releasable coupling, for example in the form of a channel means removably insertable into a suitable recess in such a inlet/outlet/aperture to effect a fluid tight communicating connection therebetween. Such channel means conveniently comprises a tubular element, in particular a rigid tubular element, for example being parallel sided, for example being square or rectangular, polygonal, or alternatively having a circular or elliptical cross section, with any recess into which such a tubular element is to be received preferably being shaped accordingly.

Such a tubular element can be a separable and distinct unit. However, for convenience, particularly in relation to the preferred embodiment where base board and module comprise generally planar components, the tubular element preferably comprises a projecting ferrule integral with and projecting from a first aperture comprising either a fluid supply aperture in the base board or an inlet/outlet in the module, and adapted to be received in a recess comprised as a second aperture, correspondingly either an inlet/outlet in the module or a supply aperture in the base board. In particular the ferrule projects generally perpendicularly from a generally planar surface, to effect a fluid connection between a base board and module adapted to lie generally parallel when connected.

In a most preferred form, ferrules are provided which project above the surface of the base board to be received within recesses comprising the inlet/outlet apertures of modules to be attached thereto.

Ferrules as above described can offer particular advantages. The ferrule system enables dead volume in fluid path between "chips" to be minimised. Use of ferrules allows higher density of interconnections than other fittings such as high-pressure liquid chromatography (HPLC) fittings and the like. Ferrules can withstand high pressures. Ferrules generally require a reduced thickness of material in which to be held compared to the thickness needed to hold a screw thread or like fitting, allowing much thinner layers, down to layers essentially comprising films, to be interconnected. One or a few mechanical fasteners can be used to hold together a system making multiple fluid connections through the ferrules.

The ferrules ensure accurate mechanical alignment of fluid elements making accurate module placement easy.

It is generally easy to machine suitable ferrule recesses within the materials typically envisaged for use for baseboard and modules, giving scope for a range of ferrule and recess shapes. The internal bore and external diameter can be varied within limits, making it possible for the ferrule to incorporate microfluidic functionality. For example the internal bore could incorporate a filtration function, optionally comprising multiple holes (in manner analogous to a photonic crystal). For example the ferrule can be modified to a larger shape to include a reservoir function.

Optionally the fluid coupling can incorporate additional functionality in that it includes within a fluid channel therewithin a fluidly active component, rather than serving merely as a channel. The fluid coupling could contain a non-return valve, for example a ball valve. The ball valve could conveniently be magnetically switchable valve. The fluid coupling could contain a catalyst frit or could incorporate a filter. Various switches could be conceived.

It is possible to use a conducting for example metallic fluid coupling such as a metallic ferrule to effect an electrical as well as a fluid interconnection between modules and/or boards. Such a metallic coupling may optionally be provided with an insulating layer on a fluid and/or module contacting surface, effecting an electrical contact between modules and/or electrical contact with fluid therein. A ferrule based design offers particular flexibility in that the system may readily be provided with further functional interconnections (eg magnetic, optical) either integral with or separately from the ferrule.

Optionally the ferrule can incorporate or be provided with a closure for closing a pathway not being used in a particular device combination allowing redundancy in pathway choice in base board for example during plug and play use. The closure may comprise a bung to be applied by a user, or an integral closure valve adapted to be operated manually, or to operate automatically on insertion of ferrule into recess.

The invention hereinabove has been described in terms of a single baseboard with a plurality of modules disposed in a single layer thereupon. It will be readily appreciated that the invention is not so limited. A particular flexibility of the invention is that it allows for multi-level stacking of modules and/or primary base boards and/or intermediate level boards. Such intermediate level boards may serve merely to provide fluid connections in the form of channels, chambers or the like, or may also include active microfluidic components. Similarly, it will be understood that the invention encompasses modular structures comprising a plurality of modules as hereinbefore described and at least one primary base board, in which the base board is also optionally provided with active microfluidic components.

References hereinabove to features of the primary baseboard will be understood to be equally applicable to such intermediate level boards. Intermediate level boards may be constructed as above described and preferred features thereof will be construed by analogy. In particular, boards are preferably planar, and preferably of a sandwich construction as above.

In embodiments comprising such a multi-level stacking system, any component adapted for use at an intermediate level will comprise at least one inlet aperture on a first "lower" surface and at least one outlet aperture on a second "upper" surface (it being understood that lower and upper are being used herein as a convenience to refer to surfaces proximal and distal to the base board, and not to imply any restrictive orientation). References herein to inlets/outlets in a module will be understood to apply equally where appropriate to such a lower aperture, and references herein to a base board fluid supply aperture will be understood to apply equally where appropriate to such an upper aperture in an intermediate level component. It is particularly easy to stack multiple layers using the preferred ferrule embodiment.

In a preferred embodiment, fluid connections are effected by projecting ferrules between components adapted to lie generally parallel. In multi-level systems, it will be convenient that these ferrules all project in the same direction. In particular, ferrules are preferably provided at apertures in the upper surface of the base board and at apertures in the upper surface of all intermediate level modules, to be receivingly engaged in fluid tight connection within recessed portions at apertures on the lower surface of all intermediate level components and all top level components.

Attachment of a module to the board, or of an upper layer module, to a lower layer module in multi-layer systems, may be achieved by any suitable releasable attachment means, including without limitation screws or screw fixings, bayonet fittings whether quick release or not, push and snap fit connectors, vacuum or mechanical clamping connections, releasable mutually engageable resilient hook and felt pads, hooks, clips etc. The fluid couplings themselves, especially in the preferred form as channel means in interference fit between pairs of linked apertures, for example ferrules engaged in interference fit in recesses, may assist in or even suffice to constitute such mechanical connection. However, additional mechanical connectors will usually be preferred.

The system in accordance with the invention provides a plurality of interchangeable elements enabling a plurality of different microfluidic functions to be performed, on one or more levels.

In accordance with the invention in a further aspect a method of providing a microfluidic system as a modular assembly comprises assembling the system above described. In particular the method comprises the steps of:

providing at least one base board having a plurality of fluidly linked fluid supply apertures on one or both sides thereof and a plurality of fluid channels and/or chambers lining in fluid communication at least some of the supply apertures;

providing a plurality of microfluidic modules, each having one or more fluid inlets and/or outlets and at least one fluid channel or chamber in fluid communication therebetween;

connecting the modules to the base board via fluid couplings adapted to effect releasable fluid-tight connection therebetween via a supply aperture on the base board and an inlet/outlet on the module;

such that the fluid channels or chambers within the modules act in co-operation with fluid channels or chambers in the baseboard to complete a desired microfluidic circuit.

Other features of the method will be understood by analogy.

Figure 1:
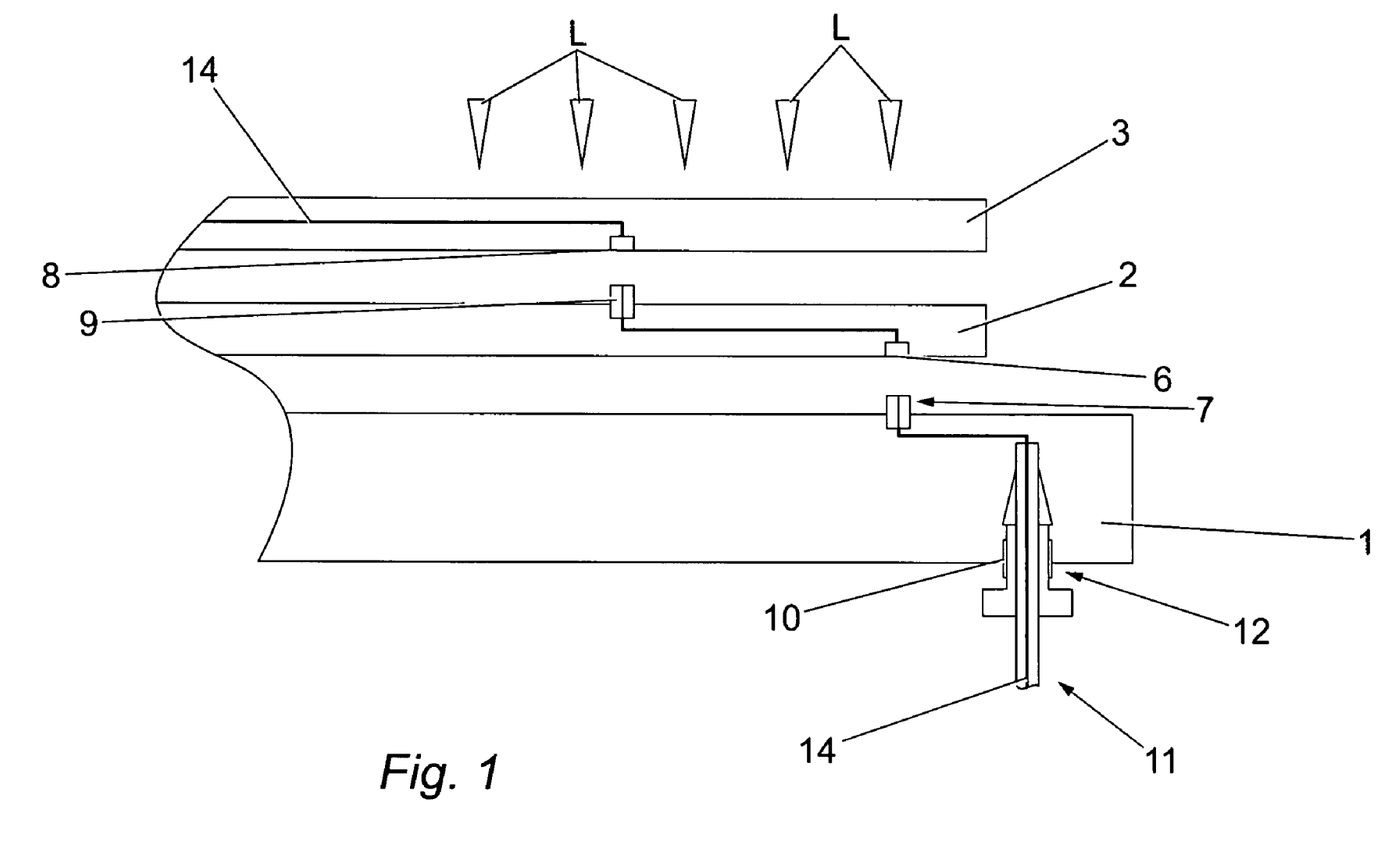
FIG. 1 illustrates in cross section how fluid connection is effected between components in accordance with the invention.

The invention will now be described by way of example only with reference to FIGS. 1 to 8 of the accompanying drawings wherein:

FIG. 1 illustrates in cross section the basic design of fluid connection in accordance with the preferred embodiment of the invention employing projecting ferrules.

Illustrated schematically in FIG. 1 are a baseboard (1), a first level component layer (2) and a second level component layer (3). The three layers are shown in exploded view disassembled but aligned for assembly.

Fluid connection within the system is effected by insertion of ferrules (7, 9) respectively provided at an upper supply aperture in the base board (1) and at an upper outlet aperture in the first level board (2) which are received in the recesses (6, 8) respectively provided in a lower surface of the first level board (2) and in a lower surface of the second level board (3). In the embodiment, the connection employs simple parallel-sided holes to take PTFE tubes forming the ferrules (7, 9) although it will be understood that more complex holes and ferrules are possible. The ferrules are retained within the holes in interference fit to provide a fluid tight leak proof connection.

In the example shown fluid supply is effected via an inlet fluid source aperture (10) comprising flexible tubing (11) of 1/16 inch (1.5 mm) diameter retained within HPLC fittings (12). The fluid path is shown by the dark line (14).

To assemble the modular structure into a laboratory system, a mechanical load is applied in the direction of the arrows (L) to effect engagement between the ferrules (7, 9) and the recesses (6, 8). Additional mechanical fixings (not shown) might be provided to ensure a more secure mechanical connection between the components (1, 2, 3).

Figure 2:
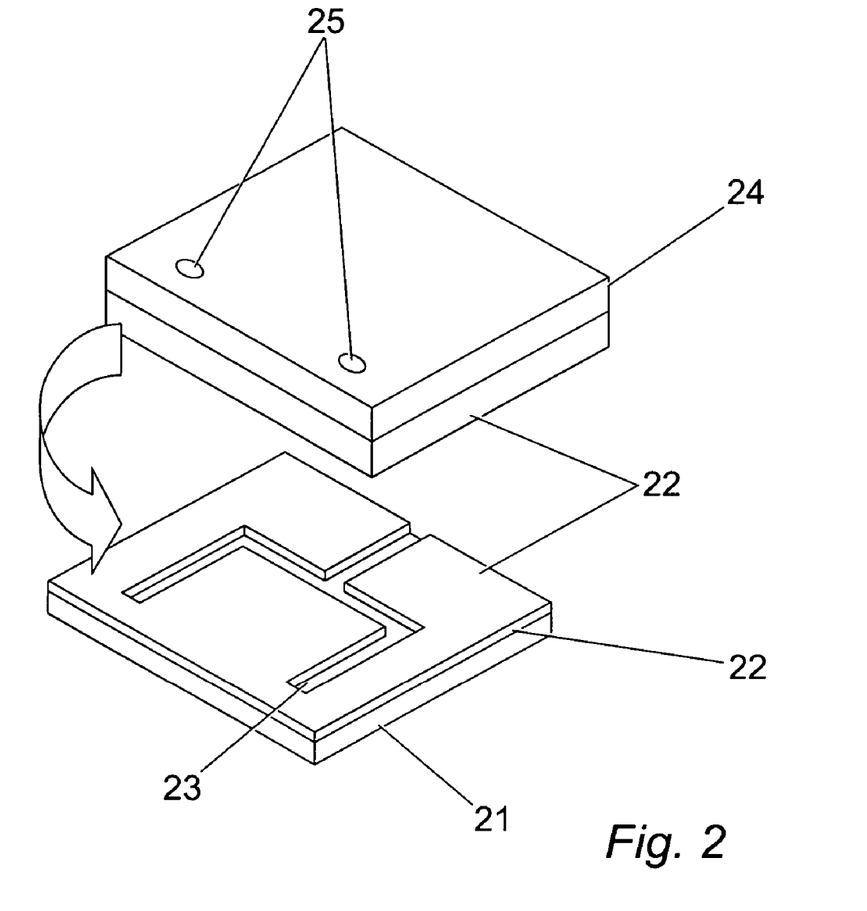
FIG. 2 is a schematic illustration of a simple basic construction of a microfluidic device for use with the invention.

A simple schematic device construction is illustrated in the exploded view in FIG. 2. The example device has a sandwich layer structure comprising an external base layer (21) of polyetheretherketone (PEEK), a pair of inner layers (22) of photoimagable epoxy and an upper layer (24) of polymethylmethacrylate (PMMA) and internal layers (22). Channel means (23) are provided in the inner epoxy sandwich layer (22) to provide the necessary microfluidic microstructure. Fluid ports (24) through the upper layer (24) give a fluid communication from a surface of the completed device to the channel means (23) which form enclosed internal channels once the two parts illustrated in the exploded view of FIG. 2 are assembled.

The sandwich layer elements (22) and upper layer (24) contact fluid in use, respectively in the channels (23) and ports (25). Accordingly these are fabricated from materials exhibiting good chemical resistance, in the example respectively photimagable epoxy and PEEK. Properties of the merely structural lower layer (21) are less critical.

The simple schematic in FIG. 2 does not illustrate any active microfluidic devices. It will be understood that these could be incorporated suitably within the channels themselves (for example in particular if these take the form of pumps, valves, filters or the like) or could be incorporated on a module surface in fluid communication with the channels (23).

Figure 3:
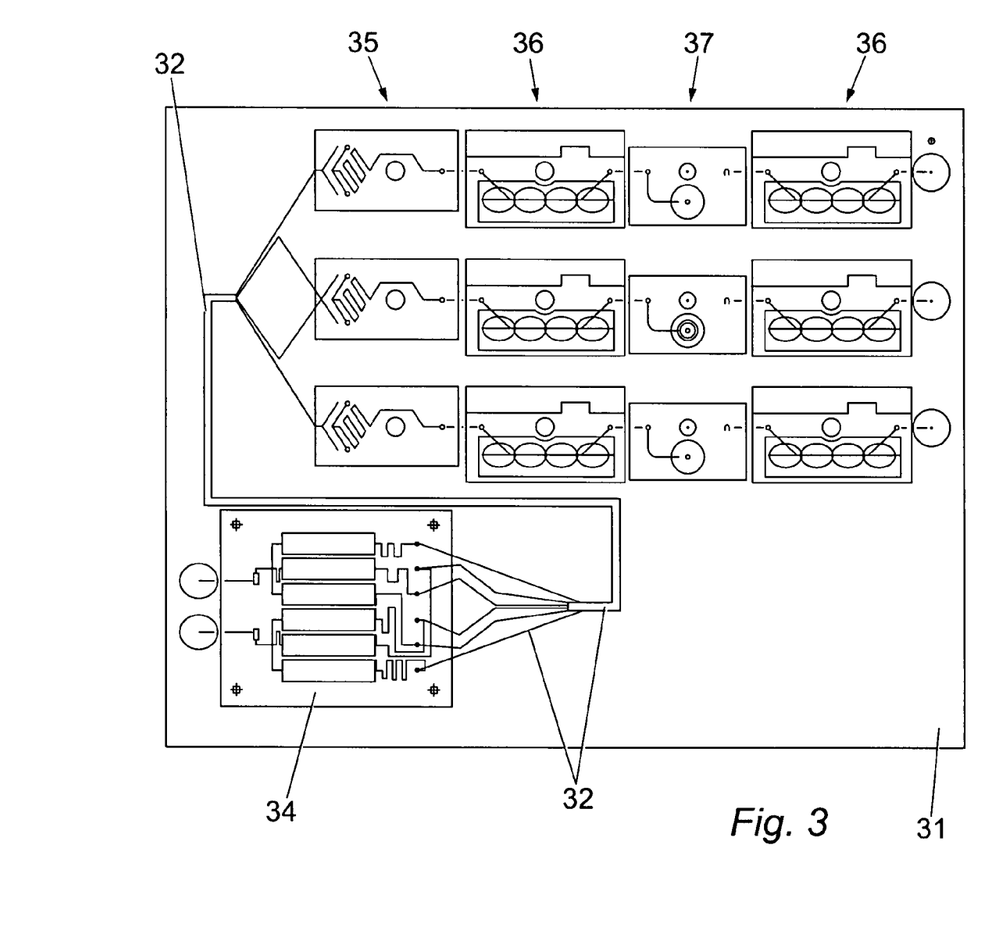
FIG. 3 is an example microreactor system employing the principles of the invention.

A microfluidic reaction system in accordance with the invention is illustrated in plan view in FIG. 3. The reactor comprises inlets for two supply fluids ("fluid A" and "fluid B"), and provides for three processing streams ("stream 1", "stream 2", "stream 3").

The reactor comprises a baseboard (31) incorporating a plurality of fluid supply channels (32) therewithin. The base board has a number of microfluidic components mounted thereupon, being a manifold (34) to split the supply fluid (A, B) into the three streams (streams 1, 2, 3), and then within each stream a series of modules comprising a mixer chip (35), a detector chip (36), a reactor chip (37) and a further detector chip (36). These components are shown separately in FIGS. 4 to 8.

A system constructed in accordance with the principles of the invention as illustrated by FIG. 3 offers admirable simplicity and flexibility, providing a number of advantages over conventional designs. In particular it enables use of larger interconnect components and scaling from the macro to the micro world by microfluidic "fanning" (transition from large pitch to small pitch spacing between fluidic channels). Fittings from chip to board enable close packing of interconnections on <2 mm square packed spacing or <1 mm staggered spacing.

Figure 4:
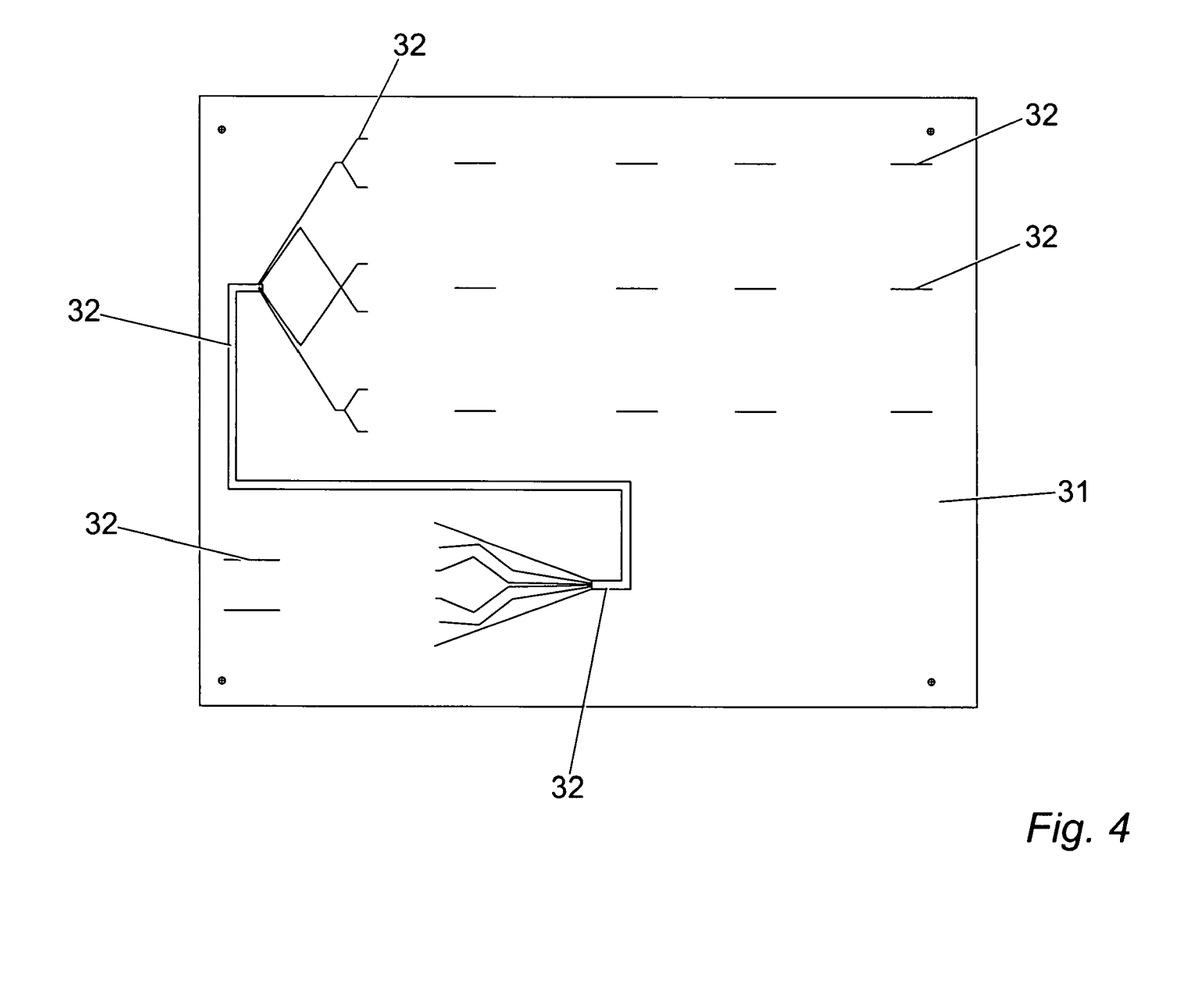
FIG. 4 is a plan view of the baseboard of the reactor of FIG. 3.

FIG. 4 illustrates in plan view the baseboard (31) of FIG. 3 without the components attached. The fluid channel means provided within the baseboard (32) are illustrated more clearly.

Figure 5:
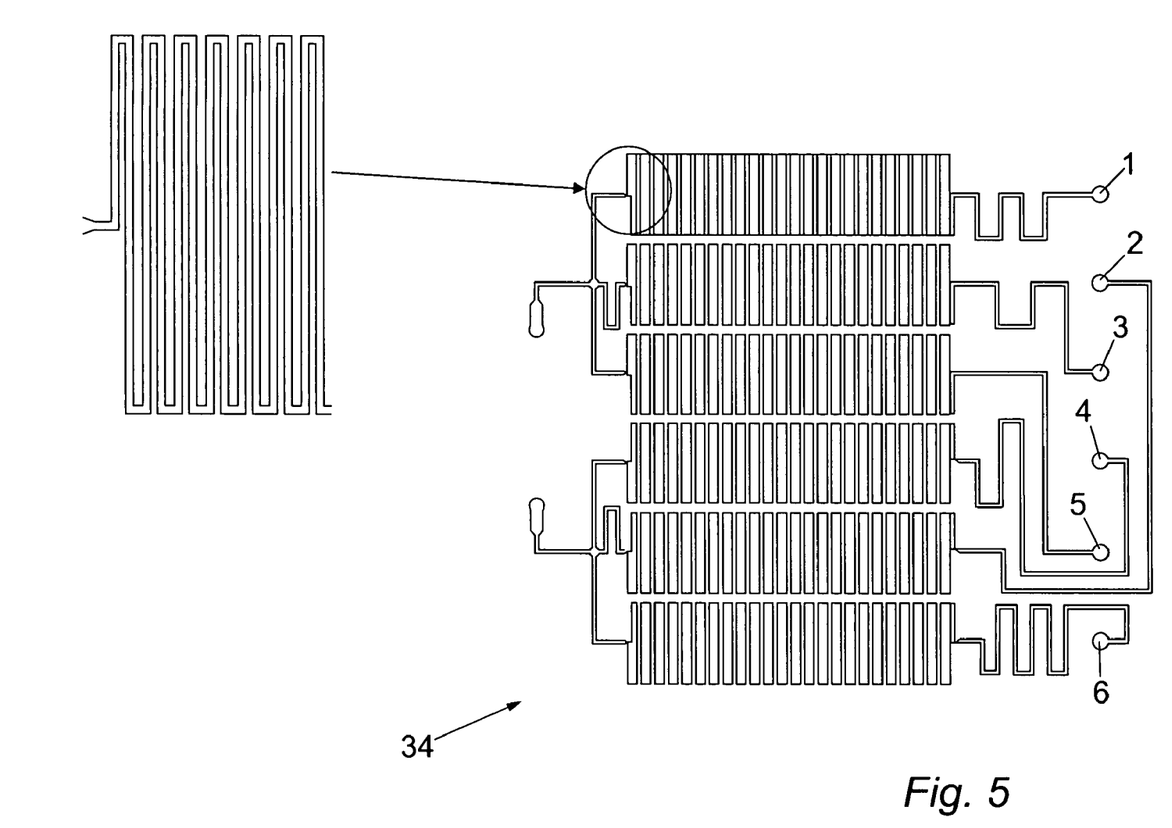
FIG. 5 is an on chip manifold from the reactor of FIG. 3.

The manifold (34) of FIG. 3 is illustrated in greater detail in plan view in FIG. 5. It can be seen from FIG. 5 how the manifold receives from a single inlet the two fluids (fluid A, fluid B) and produces 6 outlets, 1 to 6, effecting a paired supply of fluid A and fluid B to the three streams illustrated in FIG. 3.

The device is constructed in accordance with the principles of FIG. 2. Channel size in the example is 150 μm by 50 μm. Routing is effected through 300 μm channels. The overall size of the device is 62 by 72 by 4 mm.

Figure 6:
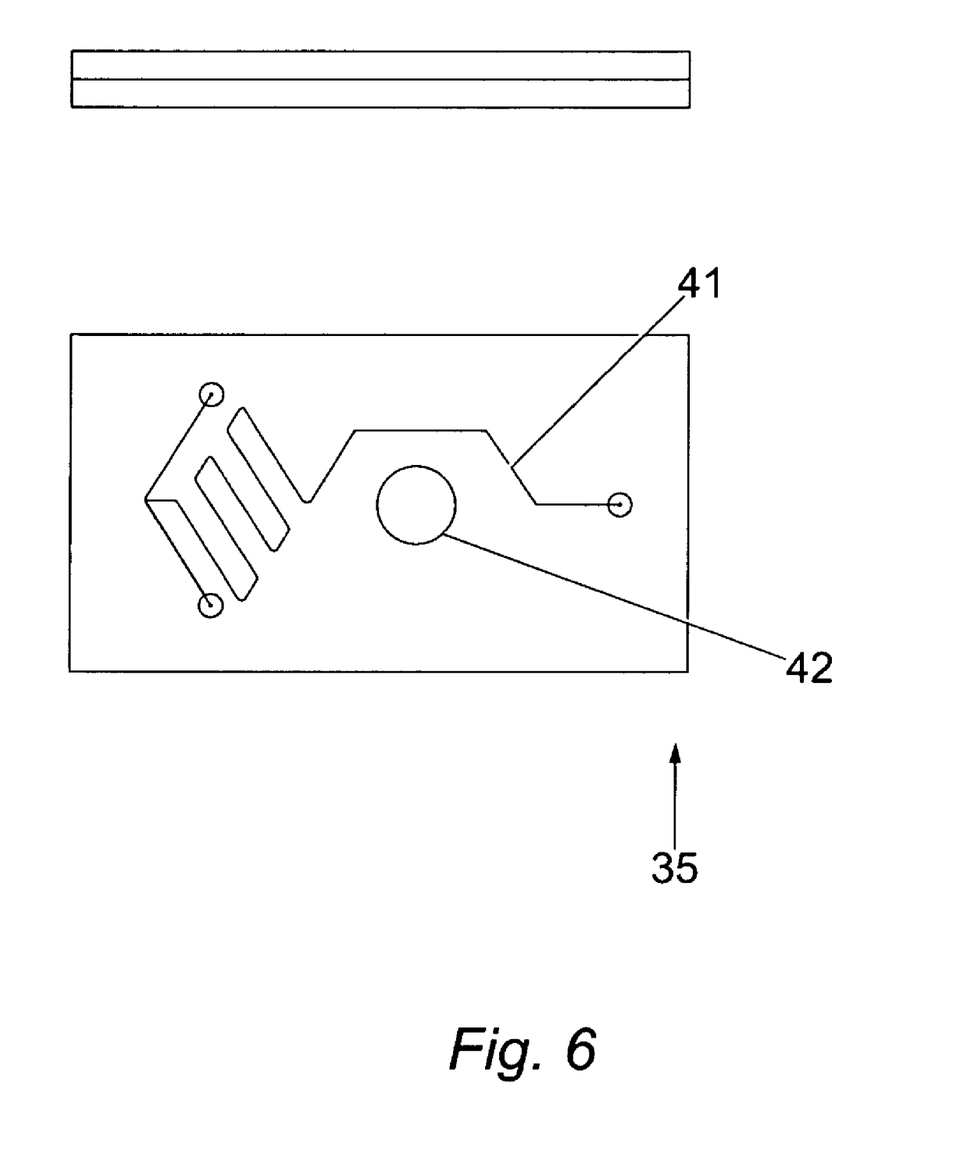
FIG. 6 is a plan view of a first active microfluidic device from the reactor of FIG. 3.

FIG. 6 illustrates in side view (above) and plan view (below) the micro mixer chip of FIG. 3. The micromixer chip receives two fluid streams comprising fluid A and fluid B respectively in inlet A and inlet B. These are mixed together as they follow the flow channel (41) to the outlet. The chip is of a basic design as illustrated in FIG. 2, with a channel size of 100 μm by 50 μm and an overall size of 45 by 25 by 4 mm. It is retained in position on the baseboard by means of the clamp (42).

Figure 7:
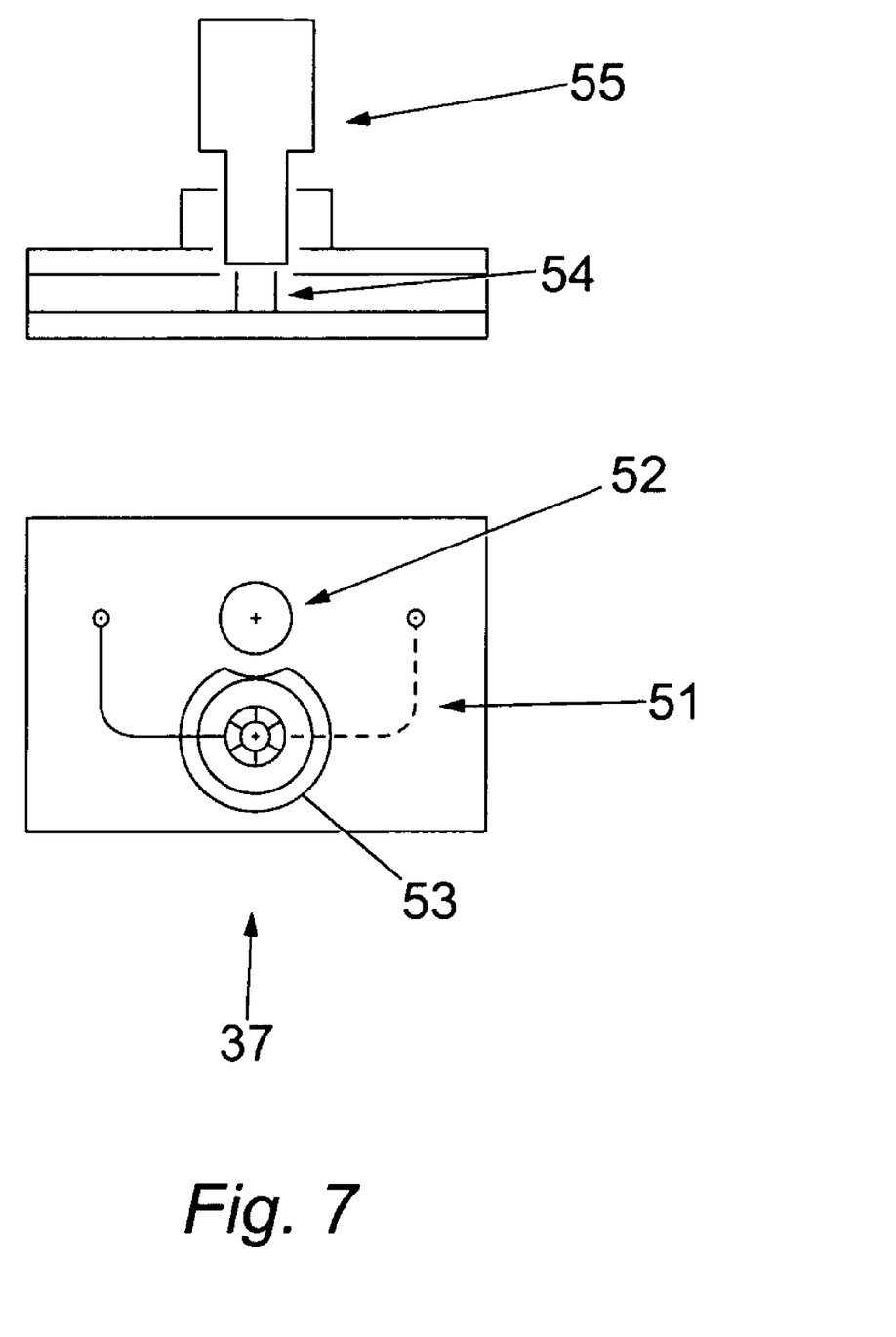
FIG. 7 is a plan view of a second active microfluidic device from the reactor of FIG. 3.

FIG. 7 is a representation of a reactor chip (37) from FIG. 3 shown in side view (above) and plan view (below). Fluid flows from inlet to outlet via the flow channel (51) thereby passing through the reactor portion (53). The reactor portion comprises a catalyst bed (54) 3 mm in diameter and 2 mm deep retained by the screw in plug (55). The overall assembly has a channel size of 100 μm by 50 μm, an overall size of 36 by 25 by 6 mm, and is retained in position by the clamp (52).

Figure 8:
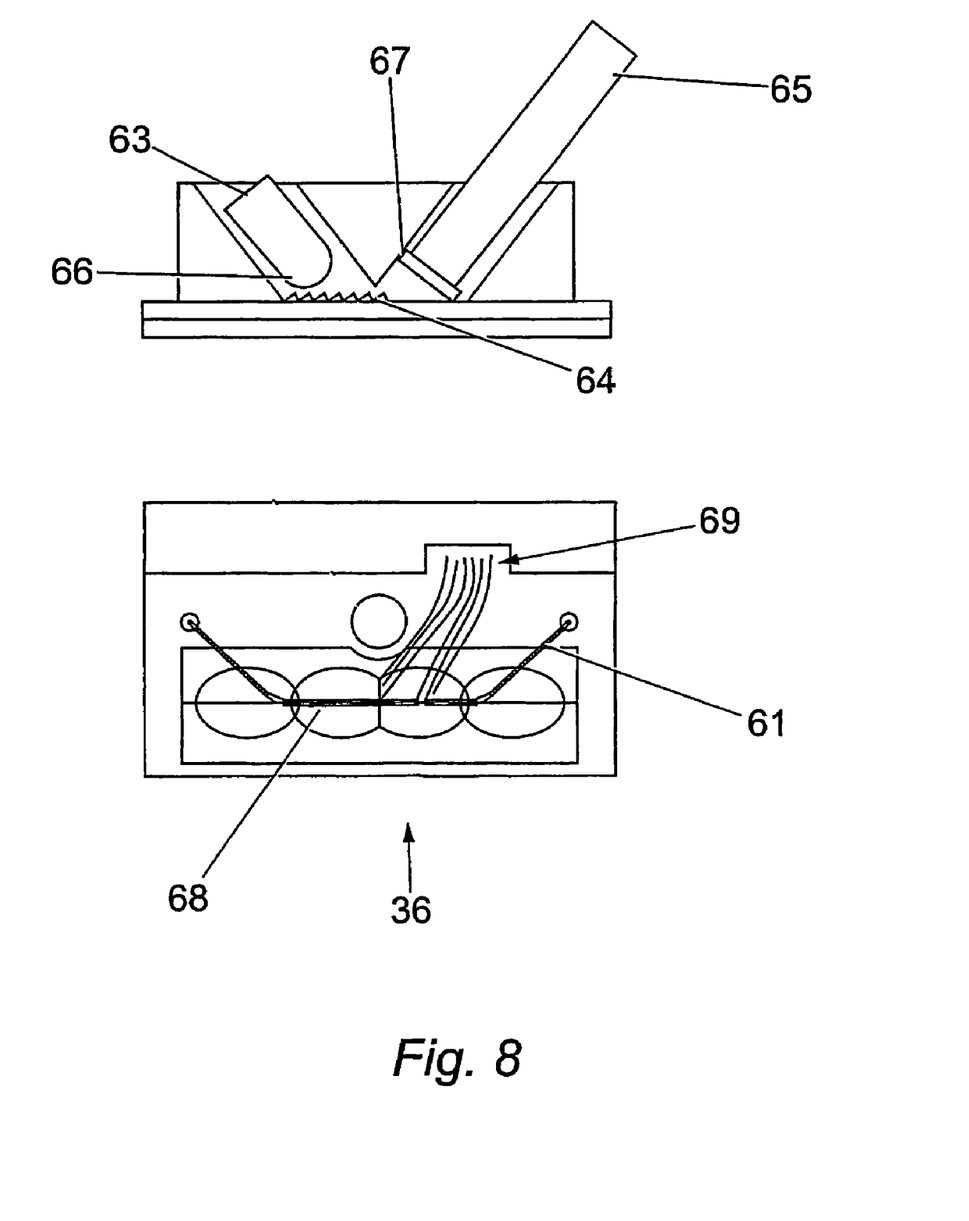
FIG. 8 is plan view of a third active microfluidic device from the reactor of FIG. 3.

FIG. 8 illustrates the detector chip (36) of FIG. 3 in side view (above) and plan view (below). Fluid flows from inlet to outlet via the flow channel (61).

The detector's active area (68) includes a light source in the form of an LED (63) or an optical fibre (not shown) to an external source, a diffraction grating (64) and a light collector in the form of the optical fibre (65). A lens (66) in front of the light source collimates the light and a lens (67) in front of the light collecting fibre improves the light collection efficiency. Collected light is sent for spectral analysis.

Additional electrical detection function is provided via groups of 3 gold microelectrodes (69), 110 μm wide on 200 μm pitch. Channel size is 400 μm by 400 μm, giving an overall device dimension of 50×30×5 mm.

It has been noted that systems in accordance with the invention can be given enhanced functionality by using a combination of materials and components and by using composite substrates for the baseboard and chips to achieve the best combination of properties.

For example, in the case of a microchemical reactor it is beneficial to use a "window" substrate polymer that is transparent to enable easy inspection of the fluid path, but in which inserts are included in the substrate in the regions where solvent contact is possible; preventing contact with the "window" substrate.

Figure 9:
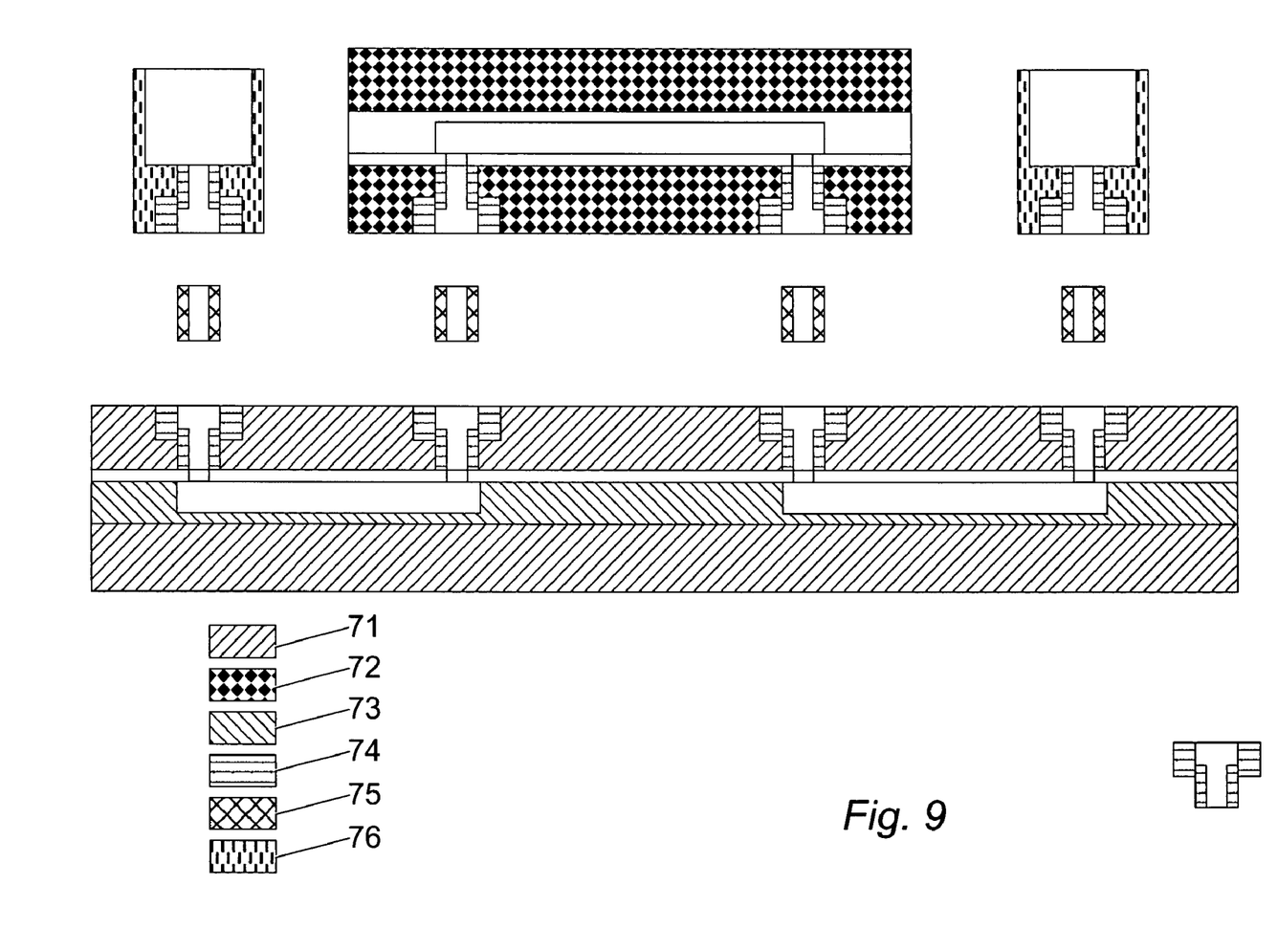
FIGS. 9 and 10 are examples of composite microfluidic device/substrate arrangements using a combination of materials to achieve the best combination of properties.

An example of such a composite structure is given in FIG. 9. In the figure different materials are represented by different shading, comprising, in accordance with the illustrated key:

71—Baseboard substrate material (e.g. PMMA);
72—Chip substrate material (e.g. PMMA)
73—photoimagable epoxy
74—Chemically resistant inserts (e.g. PEEK)
75—Ferrules (e.g. PTFE)
76—Fluid connector (e.g. PEEK)

The insert is simply a cylinder traversing the substrate through which is drilled a fluid path way and recess to support a ferrule. The material of the insert can be chosen from high chemical resistance polymers such as PEEK or PTFE or in a curable resin formed by micromoulding or lithographically using a photoformable resin. The inserts can be produced by any method including machining or injection moulding.

More complex inserts might have the ferrule integral with the insert. Although this would inhibit ferrule replacement it may be a good option for large arrays of chips where multiple ferrule insertion would be time consuming. This is illustrated by the elements 77 in FIG. 10, where otherwise like numerals are used for like materials.

The concept of using a composite approach to achieve the required properties at the optimum location can also be extended to the microfluidic channel walls. The surface properties of the walls should ideally be matched to the desired flow characteristics of the material being transported by the channel. For example, if low wall contact resistance is required a low surface energy coating is a more convenient method of achieving the desired effect compared to producing the whole system in a low surface energy polymer. For example, a photoimagable epoxy treated with Fluorolink S10 (Ausimont)—a di-triethoxysilane based on a linear perfluoropolyether backbone reduces the surface energy to 13 dynes/cm. Conveniently the walls of the channels can alternatively be treated to make them hydrophilic or hydrophobic or to provide biocompatibility etc.

Figure 10:
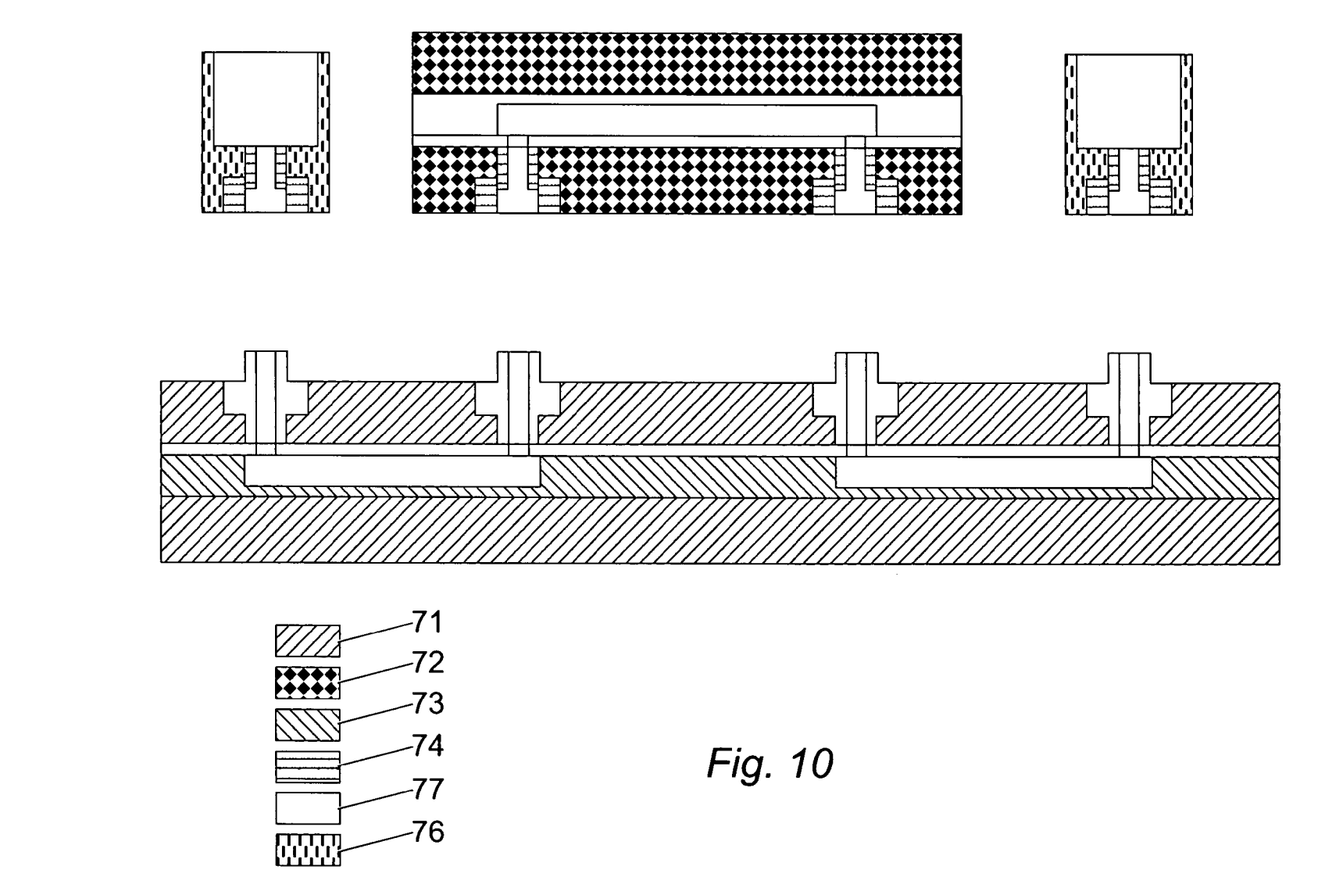
Figure 11:
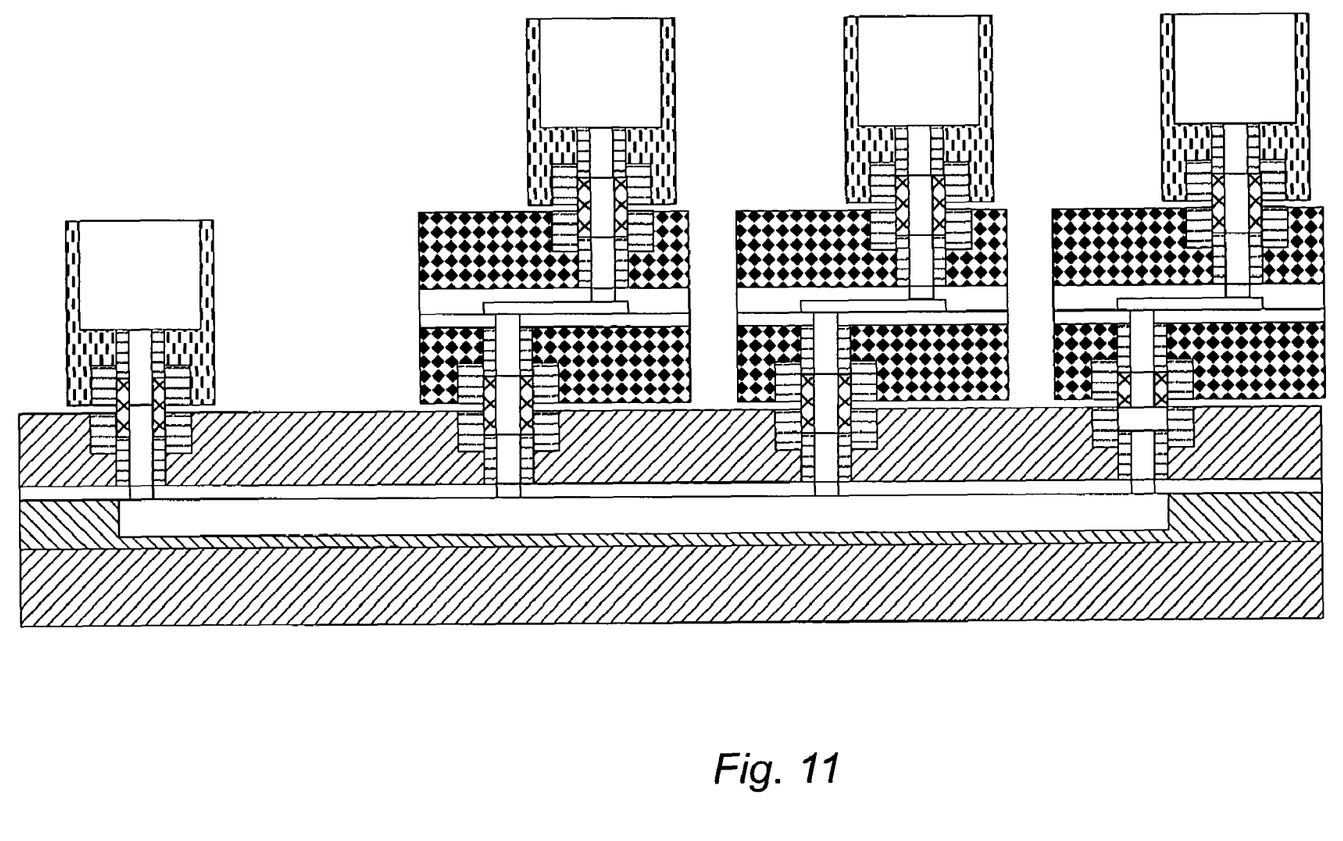
FIGS. 11 and 12 are examples of reactor chip arrangements employing the composites of FIGS. 9 and 10.
Figure 12:
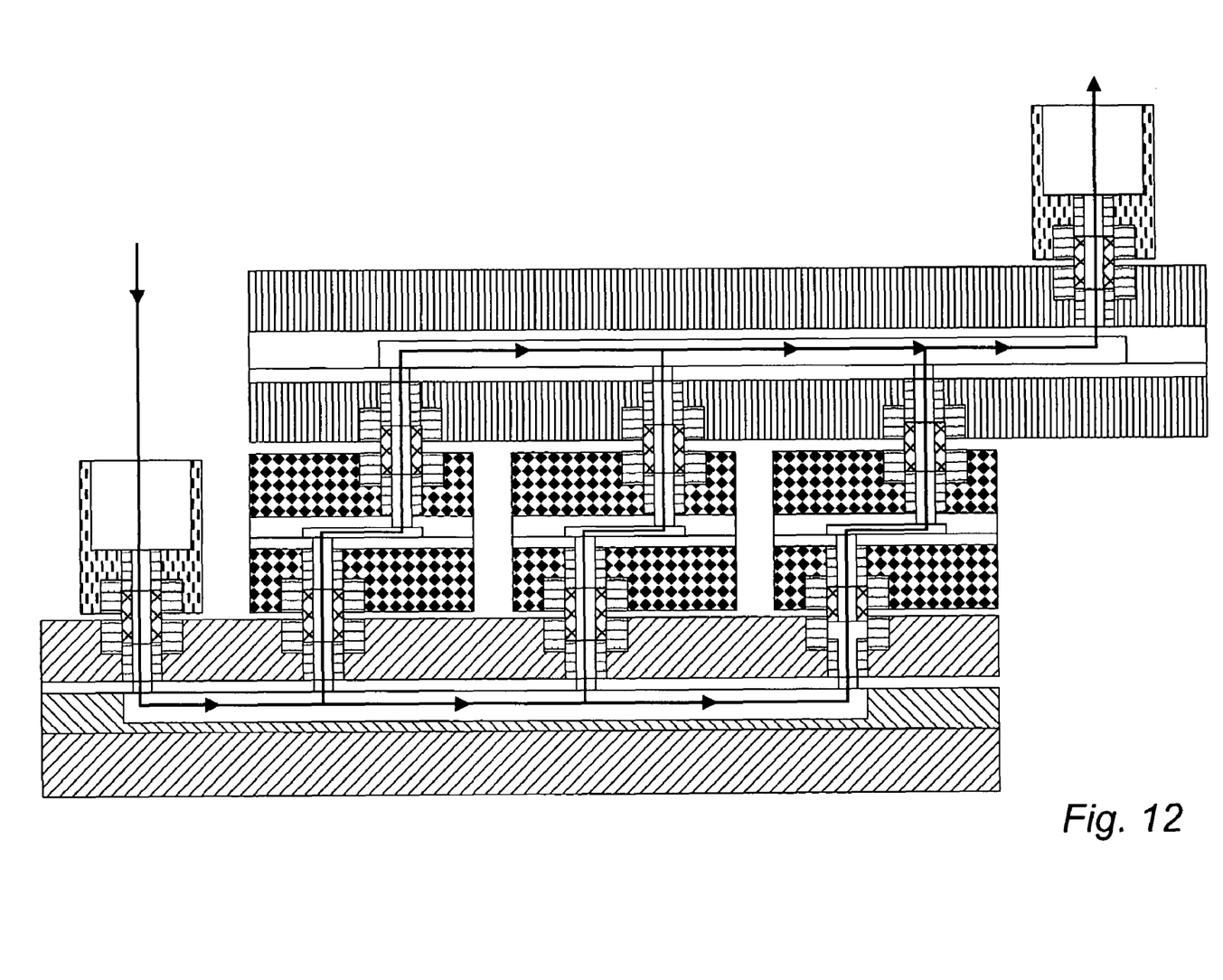

A further benefit of the interconnected baseboard and processor chip concept underlying the present invention is the possibility of application to scale up by scale out. Scale out is the term often applied to increasing output from a processor chip performing, for example, a synthetic procedure by multiplying the number of processor chips. This preserves the reaction conditions for the channel dimensions optimised for a single process or series of processes which would otherwise change if the channel dimensions were increased to achieve higher throughput. This can be achieved by the baseboard functioning as a manifold, supplying reagents to an array of processor chips. The manifold can provide a single sided input to multiple outputs from each processor chip). A manifold on one side can provide an interdigitated input and output array of channels or one side can provide an input manifold and a higher level board can provide an output manifold Examples of such arrangements exploiting the composite concept are shown in FIGS. 11 and 12, respectively illustrating the use of a baseboard as a manifold for supplying fluid in parallel to an array of processors with multiple outputs from each processor chip and the use of baseboards as input and output manifolds for feeding processor chips in parallel for scale up by scale out or by processor replication. The shading key of FIGS. 9 and 10 is applied to the systems illustrated in FIGS. 11 and 12.

The interconnection system provides a ready means of developing processes by series interconnection of each operation with optimisation of each operation readily achieved by exchange of chips. Once a series of operations are optimised they can be conveniently integrated into a single chip and then if required converted into arrays with the baseboard providing multiple feeds for use in high throughput screening or the baseboard serving as input and output manifolds for process replication to scale up or achieve increased throughput by scale out. In this way very large numbers of chips can be arrayed to achieve a production capability.

The complete system can be a complete hybrid of materials with for example the baseboard manifold being in polymer, the ferrule seals in polymer, the processor chips in glass, the pumping and valving system in metal possibly with internal polymer seals etc.

The invention claimed is:

1. A modular microfluidic system comprising at least one base board having a plurality of fluidly linked fluid supply apertures on one or both sides thereof, a plurality of microfluidic modules adapted to be detachably attached to the base board, each having one or more fluid inlets and/or outlets, and a plurality of fluid couplings to effect releasable fluid-tight connection between a microfluidic module and the at least one base board via a supply aperture on the at least one base board and an inlet/outlet on the microfluidic module, said fluid coupling comprising a ferrule insertable into a suitably shaped recess in such an inlet/outlet/aperture to effect a fluid tight communication therebetween, said ferrule projecting from a surface of one of said base board and microfluidic module in a direction toward a surface of the other of said base board and microfluidic module and being resilient at least in the region of fluid-tight connection between said ferrule and recess.

2. A modular microfluidic system in accordance with claim 1 wherein any recess into which said ferrule is to be received is shaped accordingly.

3. A modular microfluidic system in accordance with claim 2 wherein the ferrule is integral with, and projects from, a first aperture comprising either a fluid supply aperture in the base board or an inlet/outlet in a microfluidic module, and said ferrule is adapted to be received in a recess comprised as a second aperture, correspondingly either an inlet/outlet in a microfluidic module or a supply aperture in the base board.

4. A modular microfluidic system in accordance with claim 1 wherein the ferrule projects generally perpendicularly from a generally planar surface of the base board, to effect a fluid connection between a base board and module adapted to lie generally parallel when connected.

5. A modular microfluidic system in accordance with claim 1 further comprising at least one fluid source aperture fluidly linked thereto to supply source fluid to the system, and/or at least one fluid output aperture fluidly linked thereto to output fluid from the system.

6. A modular microfluidic system in accordance with claim 1 wherein the base board is constructed with a pattern of interconnecting microfluidic channels to provide a plurality of fluid channels and/or chambers in use linking in fluid communication at least some of the supply apertures to each other and/or to the source aperture.

7. A modular microfluidic system in accordance with claim 1 wherein each microfluidic module has a generally planar construction to be incorporated upon a generally planar base board.

8. A modular microfluidic system in accordance with claim 1 wherein different parts the at least one base board and/or microfluidic modules are fabricated from different materials.

9. A modular microfluidic system in accordance with claim 1 wherein a connecting means is provided to hold the assembly together in use and assist in maintenance of a fluid-tight connection by urging ferrules and corresponding recesses into closer association and retaining thereat with a suitable urging force.

10. A modular microfluidic system in accordance with claim 1 wherein the ferrule is a metallic ferrule to affect an electrical as well as a fluid interconnection.

11. A method of providing a microfluidic system as a modular assembly comprising the steps of:
providing at least one base board having a plurality of fluidly linked fluid supply apertures on one or both sides thereof and a plurality of fluid channels and/or chambers linking in fluid communication at least some of the supply apertures;
providing a plurality of microfluidic modules, each having one or more fluid inlets and/or outlets and at least one fluid channel or chamber in fluid communication therebetween;
providing a fluid coupling comprising a ferrule insertable into a suitably shaped recess in such an inlet/outlet/aperture to effect a fluid tight communication therebetween, said ferrule projecting from a surface of one of said base board and microfluidic module in a direction toward a surface of the other of said base board and microfluidic module and being resilient at least in the region of fluid-tight connection between said ferrule and said recess;
connecting the microfluidic modules to the at least one base board via the flexibly resilient ferrule to effect releasable fluid-tight connection therebetween via a supply aperture on the at least one base board and an inlet/outlet on the microfluidic module such that the fluid channels or chambers within the microfluidic modules act in co-operation with fluid channels or chambers in the at least one base board to complete a desired microfluidic circuit.

12. A modular microfluidic system in accordance with claim 1, wherein the ferrule is a PTFE tube.

* * * * *